Patented Nov. 8, 1949

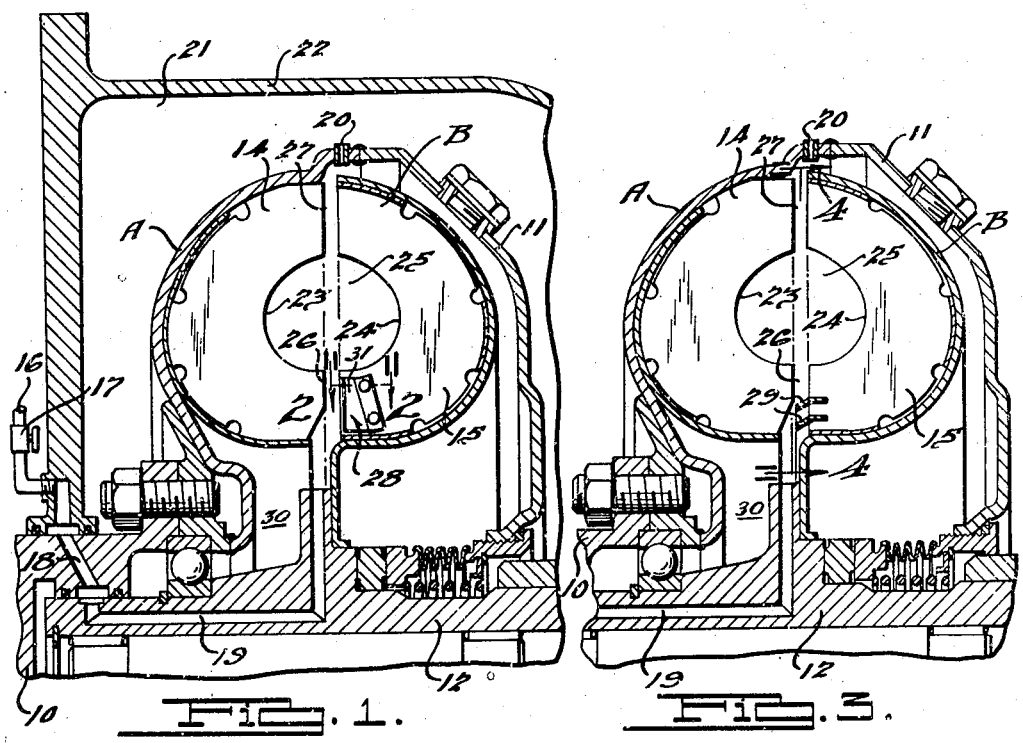
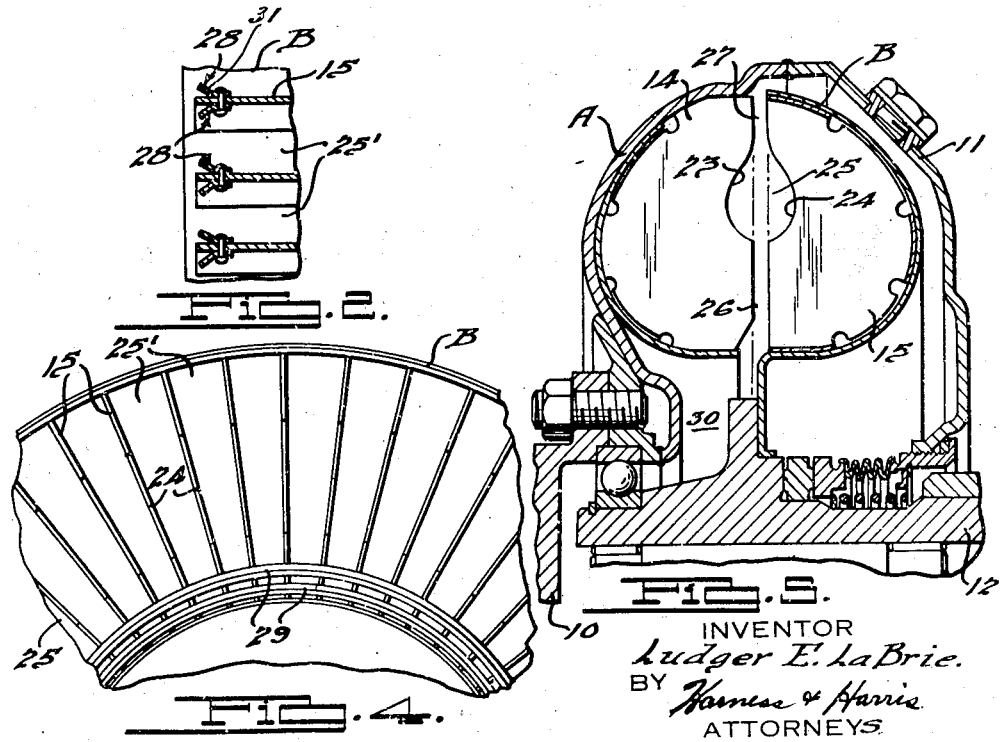

2,487,250

UNITED STATES PATENT OFFICE 2,487,250

ROTARY FLUID COUPLING AND BAFFLE MEANS THEREFOR

Ludger E. La Brie, Detroit, Mich., assignor to Chrysler Corporation, Highland Park, Mich., a corporation of Delaware Original application June 17, 1941, Serial No. 398,455, now Patent No. 2,389,441, dated November 20, 1945. Divided and this application May 18, 1944, Serial No. 536,095

10 Claims. (Cl. 60—54)

This invention relates to fluid driving devices such as fluid couplings employed to transmit drive through the medium of a working fluid, and is a division of my copending application Serial No. 398,455, filed June 17, 1941, now Patent 2,389,441 granted November 20, 1945.

An object of my invention is to provide a fluid coupling with simplified and improved means for minimizing surge and vibration.

Another object is to provide improved operation of couplings of the type having variable fill of the working fluid.

A further object of my invention is to provide an improved baffle means for the working fluid adapted to provide improved efficiency, reduction in drag, surge, and roughness, especially in fluid couplings of the variable fill types.

Further objects and advantages of my invention will be more apparent as this specification progresses, reference being had to the accompanying drawing illustrating several embodiments thereof and in which:

Fig. 1 is a longitudinal sectional elevational view through the upper half portion of my coupling;

Fig. 2 is a detail sectional plan view taken at line 2—2 of Fig. 1;

Fig. 3 is a view generally similar to Fig. 1 but showing a modification;

Fig. 4 is a sectional elevational view taken along line 4—4 of Fig. 3;

Fig. 5 is a further view generally similar to Figs. 1 to 3 but showing another modification.

Referring to the drawing, I have illustrated in Figs. 1 and 3 a fluid coupling of the variable fill type although my improvements are also applicable with resulting advantages to couplings of the fixed fill type in which the fluid is subjected to a constant fill as in Fig. 5.

In Fig. 1 the driving shaft 10 has fixed thereto the welded assembly comprising the hemi-toroidal impeller A and its shrouding 11 within which the companion hemi-toroidal runner B is disposed for driving the driven shaft 12 fixed to the runner. The impeller A carries a circumferential series of radial vanes 14 and similar vanes 15 are carried by runner B.

Where the coupling is operated with variable fluid fill to vary the slip some means is provided for controlling the quantity of fluid in the coupling. In Fig. 1 fluid is introduced by supply pipe 16 under control of valve 17 whence the fluid reaches the coupling working chamber at vanes 14 and 15 by the system of passages 18 and 19. The fluid escapes from the coupling at one or more nozzles 20 into a chamber 21 provided by stationary casing 22 having a suitable valve-controlled escape (not shown) at the bottom of the casing. By regulating the amount of fluid introduced to the coupling for a given size of escape at 20 it will be apparent that any desired quantity of fluid may be provided in the coupling. By closing valve 17 the coupling will rapidly empty at nozzle 20.

It has been deemed necessary heretofore, especially with variable fill couplings, to provide a torus ring for the vanes 14 and 15 in order to minimize surge and vibration. With my couplings I provide the vanes 14 and 15 with a recess at 23 and 24 respectively such that a toroidal chamber or space 25 is, in effect, defined around which the fluid circulates in the spaces or vane passages between adjacent vanes of the impeller and runner as at 25'. However, this chamber 25 is freely directly open to the vane passages at points between the inner transfer zone 26 and the outer transfer zone 27, that is, the vane passages directly open into the chamber 25.

The space 25 receives a non-active volume of fluid, minimizes surge and vibration and allows free circulation of the fluid without restriction as in the case of more conventional arrangements wherein torus rings are provided bounding the chamber 25. My arrangement is especially beneficial in variable fill couplings especially when operating at relatively small fills and also permits elimination of the customary torus rings with resulting simplification and saving in cost.

I have also provided an improved baffle arrangement at zone 26 comprising baffle plates 28 secured to the terminal portions of vanes 15, preferably at each side of each vane (see Fig. 2), these plates projecting circumferentially from the associated vane into a vane passage 25' so as to converge toward each other and toward the axes of rotation of the members and thereby contract the fluid passage. These baffles provide the desired restriction to fluid flow, especially at low speeds of impeller A, but do not fully cut-off the fluid flow at the vane termini thereby resulting in improved coupling efficiency, especially at relatively high coupling speeds and small slips. At high slips the baffle plates by deflecting a portion of the fluid flow toward the annular fluid chamber 30 and away from the vane passages of the impeller A serve to minimize drag and surge, and to provide smoother coupling operation than in the case of more conventional types of baffles. It will also be noted that the flange 31 of the plates 28 gradually decreases in width as its distances from the member axis is increased. This provides a less restricted zone as the torous of fluid moves outwardly under centrifugal force and hence permits a gradual acceleration of the fluid to take place.

Referring to Fig. 3, the Fig. 1 coupling is provided with a modified form of baffle means in the form of annular generally axially extending rings 29 which have frusto-conical portions projecting forwardly from the termini of runner vanes 15 and into zone 26 where the rings are deflected radially inwardly. Fluid may flow between the vane passages of member B and inner zone 26 both inwardly and outwardly adjacent each of the rings 29. The operation and advantages of these baffle rings is substantially the same as in the Fig. 1 arrangement. The baffle members 28 and 29 may be employed to advantage either with or without the novel chamber arrangement at 25 and in conjunction with either variable or fixed fill couplings.

In Fig. 5 I have illustrated the coupling of Fig. 1 without provision for variable fill, this coupling being of the fixed fill type. The Fig. 5 coupling is shown provided with the novel toroidal chamber 25, as in Figs. 1 and 3, although of slightly different shape.

In Figs. 1, 3 and 5 the fluid circulates in the vortex circuit passages provided by the vanes of impeller A and runner B, the circuit having a smooth boundary except for the restriction introduced by the baffle members 28 in Fig. 1 and 29 in Fig. 3. If desired, only one of the coupling members may have its vanes recessed as at 23 or 24 thereby defining an annular chamber of substantially hemi-toroidal shape at the central region of the vortex fluid circulation.

I claim:

1. A fluid coupling comprising cooperating substantially hemi-toroidal driving and driven members rotatable on a common axis each having a series of circumferentially spaced generally radially extending vanes defining vane passages providing vortex fluid flow between said members, and defining in relation to said axis radially inner and outer fluid transfer zones adjacent the central region of the vortex, and baffle means rotatable with the driven member and positioned within a space defined by the inner transfer zone and a vane passage of the driven member adjacent thereto, said baffle means including a body portion secured to the driven member and an inclined flange portion projecting therefrom in the general direction of the driving member and toward said axis such that a plane in the face of said flange if extended intersects the driving member axis at an oblique angle thereto, said flange serving to deflect a portion of the fluid flow in an angular direction toward the axis of rotation of the driving member and providing for a contraction of the fluid flow whereby to minimize transmission of torque at low speeds of the driving member while providing for a substantial even torque increase upon acceleration of the driving member from said low speed.

2. A fluid coupling comprising cooperating substantially hemi-toroidal driving and driven members rotatable on a common axis each having a series of circumferentially spaced generally radially extending vanes defining vane passages providing vortex fluid flow between said members, and defining in relation to said axis radially inner and outer fluid transfer zones adjacent the central region of the vortex, and baffle means rotatable with the driven member and positioned within a space defined by the inner transfer zone and a vane passage of the driven member adjacent thereto, said baffle means including a body portion secured to the driven member and a flange portion projecting therefrom in the general direction of the driving member and toward said axis such that a plane in the face of said flange if extended intersects the member axis at an oblique angle thereto, said baffle means being so positioned in relation to the driving member such that said flange imposes a directional change in normal vortex flow to a predetermined direction having a component radially inward of the inner transfer zone toward said axis and away from the vane passages of the driving member.

3. A fluid coupling comprising cooperating substantially hemi-toroidal driving and driven members rotatable on a common axis each having a series of circumferentially spaced generally radially extending vanes defining vane passages providing vortex fluid flow between said members, and defining a fluid transfer zone intermediate the vane passages of the driving member and those of the driven member, the said transfer zone connecting with an inner annular fluid chamber formed by said members, and baffle means rotatable with the driven member and positioned adjacent the termini of the vanes thereof, said means including an inclined fluid directing wall having a free edge extending in the direction of the driving member and toward said axis so as to deflect a portion of the fluid flow to said inner fluid chamber.

4. A fluid coupling comprising cooperating substantially hemi-toroidal driving and driven members rotatable on a common axis each having a series of circumferentially spaced generally radially extending vanes defining vane passages providing vortex fluid flow between said members, and defining a fluid transfer zone intermediate the vane passages of the driving member and those of the driven member, the said transfer zone connecting with an inner annular fluid chamber formed by said members, and baffle means rotatable with the driven member and positioned adjacent the termini of the vanes thereof, said means including a fluid directing wall projecting into said transfer zone and inclined inwardly toward said axis so as to direct a portion of the fluid flow to said inner fluid chamber.

5. A fluid coupling comprising cooperating substantially hemi-toroidal driving and driven members rotatable on a common axis each having a series of circumferentially spaced generally radially extending vanes defining vane passages providing vortex fluid flow between said members, and defining in relation to said axis radially inner and outer fluid transfer zones adjacent the central region of the vortex, and baffle means rotatable with the driven member and positioned within a space defined by the inner transfer zone and vane passages of the driven member adjacent thereto, said means comprising a plurality of plates secured to the side faces of the vanes in the vane passages of said driven member adjacent said inner transfer zone, each plate having a fluid flow contracting portion projecting toward said axis in the general direction of the driving member and at an oblique angle away from the vane face securing the same.

6. A fluid coupling comprising cooperating substantially hemi-toroidal driving and driven members rotatable on a common axis each having a series of circumferentially spaced generally radially extending vanes defining vane passages providing vortex fluid flow between said members, and defining in relation to said axis radially inner and outer fluid transfer zones adjacent the central region of the vortex, and baffle plates rotatable with the driven member and secured to the opposite vane faces of the vane passages adjacent said inner transfer zone, each plate having a fluid directing portion projecting toward said axis in the general direction of the driving member and at an oblique angle away from the vane face to which it is secured and the said projecting portions of the plates secured to said opposite faces converging toward each other whereby to effect a restriction of the fluid flow without breaking up the same.

7. A fluid coupling as claimed in claim 3 wherein the baffle means is in the form of a ring having a conical portion formed by said wall and including a cylindrical portion secured to vanes of the driven member.

8. A fluid coupling comprising cooperating substantially hemi-toroidal driving and driven members rotatable on a common axis each having a series of circumferentially spaced generally radially extending vanes defining vane passages providing vortex fluid flow between said members, and defining in relation to said axis radially inner and outer fluid transfer zones adjacent the central region of the vortex, and a baffle ring secured to the driven member at the inner transfer zone and coaxial with the axis of said member, said ring having a terminal portion projecting toward said axis in the direction of the driving member, the wall of said portion being disposed at an oblique angle to said axis, said terminal portion being adapted to impose a directional change in a portion of the normal vortex flow to a predetermined direction having a component radially inward of the inner transfer zone toward said axis and away from the vane passages of the driving member.

9. A fluid coupling comprising cooperating substantially hemi-toroidal driving and driven members rotatable on a common axis each having a series of circumferentially spaced generally radially extending vanes defining vane passages providing vortex fluid flow between said members, and defining in relation to said axis radially inner and outer fluid transfer zones adjacent the central region of the vortex, and a baffle ring secured to the driven member at the inner transfer zone and coaxial with the axis of said member, said member having an inwardly tapered portion projecting into the inner transfer zone for imposing a directional change in the normal vortex flow to a predetermined direction having a component radially inwardly of the inner transfer zone toward said axis and away from the vane passages of the driving member.

10. A fluid coupling comprising cooperating substantially hemi-toroidal driving and driven members rotatable on a common axis each having a series of circumferentially spaced generally radially extending vanes defining vane passages providing vortex fluid flow between said members, and defining in relation to said axis radially inner and outer fluid transfer zones adjacent the central region of the vortex, and baffle means rotatable with the driven member and positioned within a space defined by the inner transfer zone and vane passages of the driven member adjacent thereto, said means comprising a plurality of radially spaced concentrically arranged baffle rings having a cylindrical portion connected to the vanes of the driven member and a frusto-conical portion projecting into the inner transfer zone from said cylindrical portion, for directing fluid in a predetermined direction having a component radially inwardly of the inner transfer zone toward said axis and away from the vane passages of the driving member.

LUDGER E. LA BRIE.

REFERENCES CITED

The following references are of record in the file of this patent:

UNITED STATES PATENTS

| Number | Name | Date |
|---|---|---|
| 673,477 | Robinson | May 7, 1901 |
| 2,074,346 | Sinclair | Mar. 23, 1937 |
| 2,181,711 | Sinclair | Nov. 28, 1939 |
| 2,351,516 | Jandasek | June 13, 1944 |

FOREIGN PATENTS

| Number | Country | Date |
|---|---|---|
| 73,184 | Sweden | 1931 |